C. B. KOONS.
Soldering Apparatus.
No. 137,217.  Patented March 25, 1873.
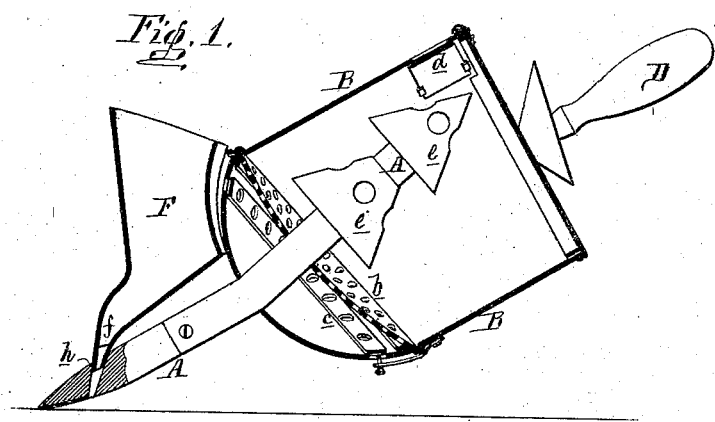
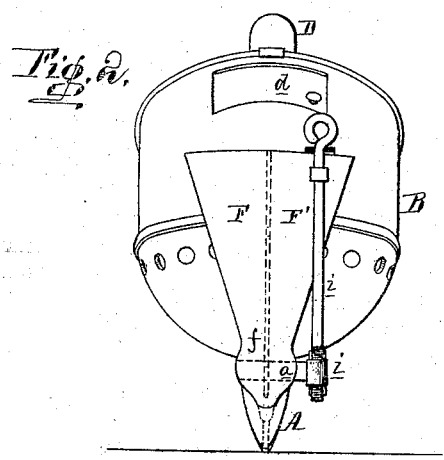
Witnesses.
Thomas McIlvain
John R. Rupertus
Chas. B. Koons
By his Atty's
Howson & Son
AM. PHOTO-LITHOGRAPHIC CO. N.Y.(OSBORNES PROCESS.)

UNITED STATES PATENT OFFICE.

CHARLES B. KOONS, OF PHILADELPHIA, PENNSYLVANIA.

IMPROVEMENT IN SOLDERING APPARATUS.

Specification forming part of Letters Patent No. 137,217, dated March 25, 1873.

*To all whom it may concern:*

Be it known that I, CHAS. B. KOONS, of the city and county of Philadelphia, State of Pennsylvania, have invented a Soldering Apparatus, of which the following is a specification:

My invention has for its object the economy of time and labor in practicing the process of soldering; and this object I accomplish by combining in one instrument a soldering-iron, A, best observed in the sectional view, Figure 1, and a furnace, B, or any other suitable heating device, the instrument having a handle, D, by which the whole may be manipulated, and the soldering-iron applied to the joints of a tin roof, or other object to be soldered, the solder and resin being supplied to the iron from funnel-shaped reservoirs F and F', the contents of which are maintained in a fused condition by the heat of the furnace.

The coal-furnace B illustrated in the drawing has a grate, $b$, and register $c$ and $d$, for regulating the draft and fuel supply, and the soldering-iron extends into this furnace, and is provided with one or more cone-shaped deflectors, $e$, which direct the heat toward the iron. The supply of molten solder, or solder and resin, or other flux, may be conducted from the reservoir F through openings $h$ in the iron, as shown in Fig. 1; or the nose $f$ of each reservoir may be lapped around the iron, as shown in the perspective view, Fig. 3.

The reservoirs are furnished with regulating-valves $a$, which I prefer to operate by a worm and wheel, $i$, as illustrated in the front view, Fig. 2.

In using the apparatus it is held in the inclined position shown in Fig. 1 by means of the handle D, and it can be operated with the same facility as an ordinary soldering-iron, over which it possesses the great advantage of remaining constantly heated when in use.

I prefer to emply the furnace B in combination with the soldering-iron; but I do not confine myself to its use, as other heating appliances—such, for instance, as a gas or vapor burner—may be attached to and arranged to direct a flame or flames onto the iron.

I claim as my invention—

1. A soldering-iron and a heater for the same combined in one instrument, substantially in the manner described.

2. The combination of the said soldering-iron and heater with a reservoir for containing solder, or reservoirs for both solder and resin, or other flux.

In testimony whereof I have signed my name to this specification in the presence of two subscribing witnesses.

CHAS. B. KOONS.

Witnesses:
WM. A. STEEL,
J. SHERBORNE SINGER.